United States Patent
Patil et al.

(10) Patent No.: US 9,973,595 B2
(45) Date of Patent: May 15, 2018

(54) NEIGHBOR AWARE NETWORK DATA LINK PROFILES

(71) Applicant: QUALCOMM Incorporated, San Diego, CA (US)

(72) Inventors: Abhishek Pramod Patil, San Diego, CA (US); Santosh Paul Abraham, San Diego, CA (US); Menucher Behram Menuchehry, Carlsbad, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 14/839,764

(22) Filed: Aug. 28, 2015

(65) Prior Publication Data
US 2016/0352863 A1 Dec. 1, 2016

Related U.S. Application Data (60) Provisional application No. 62/167,163, filed on May 27, 2015.

(51) Int. Cl.
*H04L 29/08* (2006.01)
*H04W 8/00* (2009.01)
*H04L 12/721* (2013.01)

(52) U.S. Cl.
CPC .......... *H04L 67/327* (2013.01); *H04L 45/123* (2013.01); *H04L 67/16* (2013.01); *H04L 67/303* (2013.01); *H04W 8/005* (2013.01)

(58) Field of Classification Search
CPC ..... H04L 67/327; H04L 45/123; H04L 67/16; H04L 67/303; H04W 8/005
See application file for complete search history.

(56) References Cited

U.S. PATENT DOCUMENTS

| | | | |
|---|---|---|---|
| 9,544,754 B1* | 1/2017 | Lambert | H04W 8/005 |
| 2009/0252134 A1 | 10/2009 | Schlicht et al. | |
| 2010/0082789 A1* | 4/2010 | Kim | H04L 29/12216 709/223 |
| 2011/0296154 A1* | 12/2011 | Chien | H04L 41/0846 713/2 |
| 2014/0112189 A1* | 4/2014 | Abraham | H04W 4/206 370/254 |
| 2014/0315484 A1* | 10/2014 | Matsuda | H04L 67/06 455/39 |
| 2015/0109961 A1 | 4/2015 | Patil et al. | |
| 2016/0150392 A1* | 5/2016 | Jung | H04W 8/005 455/450 |
| 2016/0353470 A1* | 12/2016 | Liu | H04L 65/4076 |

OTHER PUBLICATIONS

International Search Report and Written Opinion for International Application No. PCT/US2016/024993, ISA/EPO, dated Jun. 24, 2016, 12 pgs.

* cited by examiner

*Primary Examiner* — Wing F Chan
*Assistant Examiner* — Billy H Ng
(74) *Attorney, Agent, or Firm* — Toler Law Group, PC (57) ABSTRACT

A method for selecting a data link schedule includes selecting, at a provider device, a Neighbor Aware Network (NAN) data link profile for a service. The NAN data link profile corresponds to a set of NAN data link schedules that satisfy transmission parameters of the service. The method also includes sending the NAN data link profile in a service advertisement to a subscriber device.

28 Claims, 5 Drawing Sheets

First NAN Data Link Profile

| NAN Data Link Index | Channel No. | Offset (TUs) from Channel 6 Discovery Window | Block Width (TUs) |
|---|---|---|---|
| 0 | 6 | 1-Basic Channel | 32 |
| 1 | 36 | 2 | 32 |
| 2 | 36 | 2 | 64 |
| 3 | 36 | 2, 18 | 32 |
| 4 | 36 | 2, 18 | 64 |
| 5 | 52 | 2, 18 | 32 |

210

Second NAN Data Link Profile

| NAN Data Link Index | Channel No. | Offset (TUs) from Channel 6 Discovery Window | Block Width (TUs) |
|---|---|---|---|
| N | 6 | 1, 8, 16, 24 | 64 |
| N+1 | 6 | 1, 4, 8, 12, 16, 18, 24 | 32 |
| N+2 | 36 | 2, 10, 18, 26 | 64 |
| N+3 | 36 | 2, 6, 10, 14, 18, 22, 26 | 32 |
| N+4 | 52 | 2, 10, 18, 26 | 32 |
| N+5 | 52 | 2, 10, 18, 26 | 64 |

NEIGHBOR AWARE NETWORK DATA LINK PROFILES

I. CLAIM OF PRIORITY

The present application claims priority from U.S. Provisional Patent Application No. 62/167,163 entitled "NEIGHBOR AWARE NETWORK DATA LINK PROFILES," filed May 27, 2015, the contents of which is incorporated by reference in its entirety.

II. FIELD

The present disclosure is generally related to a neighbor aware network (NAN). More specifically, the present disclosure is related to NAN data link scheduling.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A wireless device in a Neighbor Aware Network (NAN) may provide a service to one or more other wireless devices in the NAN via a NAN data link. As non-limiting examples, the wireless device may provide a file transfer service or a video conferencing service to the other wireless devices via the NAN data link. The NAN data link may be associated with a communication schedule. For example, the communication schedule may indicate a timing and duration of paging windows, data transmission windows, etc. of the NAN data link. Thus, to receive data associated with the service, a subscriber device should occasionally monitor a communication channel associated with the NAN data link at a particular time, such as during a paging window, of the NAN data link. To enable the subscriber device to monitor the communication channel at appropriate times, the wireless device may provide information about a schedule of the NAN data link to the subscriber device.

IV. SUMMARY

According to one aspect of the disclosure, a method for selecting a data link schedule includes selecting, at a first device, a Neighbor Aware Network (NAN) data link profile for a service of the first device. The NAN data link profile corresponds to a set of NAN data link schedules that satisfy transmission parameters of the service. The method also includes sending information identifying the NAN data link profile in a service advertisement to a subscriber device.

According to another aspect of the disclosure, a first device includes a processor and a memory storing instructions executable to cause the processor to perform operations including selecting a Neighbor Aware Network (NAN) data link profile for a service. The NAN data link profile corresponds to a set of NAN data link schedules that satisfy transmission parameters of the service. The operations also include sending the NAN data link profile in a service advertisement to a subscriber device.

According to another implementation of the disclosed techniques, a non-transitory computer-readable medium includes instructions for selecting a data link schedule. The instructions, when executed by a processor within a provider device, cause the processor to perform operations including selecting a Neighbor Aware Network (NAN) data link profile for a service of the provider device. The NAN data link profile corresponds to a set of NAN data link schedules that satisfy transmission parameters of the service. The operations also include sending the NAN data link profile in a service advertisement to a subscriber device.

According to another implementation of the disclosed techniques, an apparatus includes means for selecting a Neighbor Aware Network (NAN) data link profile for a service of a provider device. The NAN data link profile corresponds to a set of NAN data link schedules that satisfy transmission parameters of the service. The apparatus also includes means for sending the NAN data link profile in a service advertisement to a subscriber device.

According to another implementation of the disclosed techniques, a method for subscribing to a service includes selecting, at a subscriber device, a particular Neighbor Aware Network (NAN) data link schedule from a set of NAN data link schedules corresponding to a NAN data link profile. The NAN data link profile is associated with the service, and each NAN data link schedule in the set of NAN data link schedules satisfies transmission parameters of the service. The method also includes transmitting data to a provider device based on the particular NAN data link schedule.

According to another implementation of the disclosed techniques, an apparatus includes a processor and a memory storing instructions that are executable to cause the processor to select a particular Neighbor Aware Network (NAN) data link schedule from a set of NAN data link schedules corresponding to a NAN data link profile. The NAN data link profile is associated with a service of a provider device, and each NAN data link schedule in the set of NAN data link schedules satisfies transmission parameters of the service. The apparatus also includes a transceiver operable to transmit data to the provider device based on the particular NAN data link schedule.

According to another implementation of the disclosed techniques, a non-transitory computer-readable medium includes instructions for subscribing to a service. The instructions, when executed by a processor within a subscriber device, cause the processor to perform operations including selecting a particular Neighbor Aware Network (NAN) data link schedule from a set of NAN data link schedules corresponding to a NAN data link profile. The NAN data link profile is associated with the service, and each NAN data link schedule in the set of NAN data link schedules satisfies transmission parameters of the service. The operations also include transmitting data to a provider device based on the particular NAN data link schedule.

According to another implementation of the disclosed techniques, an apparatus includes means for selecting a particular Neighbor Aware Network (NAN) data link schedule from a set of NAN data link schedules corresponding to a NAN data link profile. The NAN data link profile is associated with a service of a provider device, and each NAN data link schedule in the set of NAN data link schedules satisfies transmission parameters of the service. The apparatus also includes means for transmitting data to the provider device based on the particular NAN data link schedule.

One advantage provided by at least one of the disclosed implementations is simplified exchange of NAN data link schedule information. For example, a NAN data link schedule (that conforms to attributes of a particular application) can be indicated based on a profile. Each profile can correspond to a "standardized" NAN data link schedule. Other aspects, advantages, and features of the present disclosure will become apparent after review of the entire application, including the following sections: Brief Description of the Drawings, Detailed Description, and the Claims.

VI. DETAILED DESCRIPTION

Various aspects of the present disclosure are directed to using Neighbor Aware Network (NAN) data link profiles to communicate NAN data link schedule information. For example, the present disclosure may enable a provider device to advertise a service and a NAN data link profile of the service in a service advertisement. A service may be provided by an application associated with a provider device. According to one implementation, the application may be executed on the provider device. The NAN data link profile may correspond to a set of NAN data link schedules that satisfy transmission parameters of the service (or parameters of the application). For example, the transmission parameters may include a latency parameter, a throughput parameter, a connectivity topology associated with the service, etc. Upon receiving the service advertisement, a subscriber device may subscribe to the service and may "negotiate" with the provider device to select a particular NAN data link schedule. For example, the subscribe device may select a particular NAN data link schedule that is associated with the NAN data link profile, and may indicate the selected NAN data link schedule to the provider device.

According to the techniques described herein, each NAN data link profile may correspond to one or more NAN data link schedules that are "standardized". According to one implementation, each NAN data link profile may identify one or more NAN data link schedules that are standardized. Standardizing the NAN data link schedules may improve efficiency in selecting a NAN data link schedule for a particular service or application. For example, the provider device and/or the subscriber device may select a NAN data link schedule from a set of "pre-defined" NAN data link schedules, as opposed to creating a new transmission schedule for each service.

Figure 1:
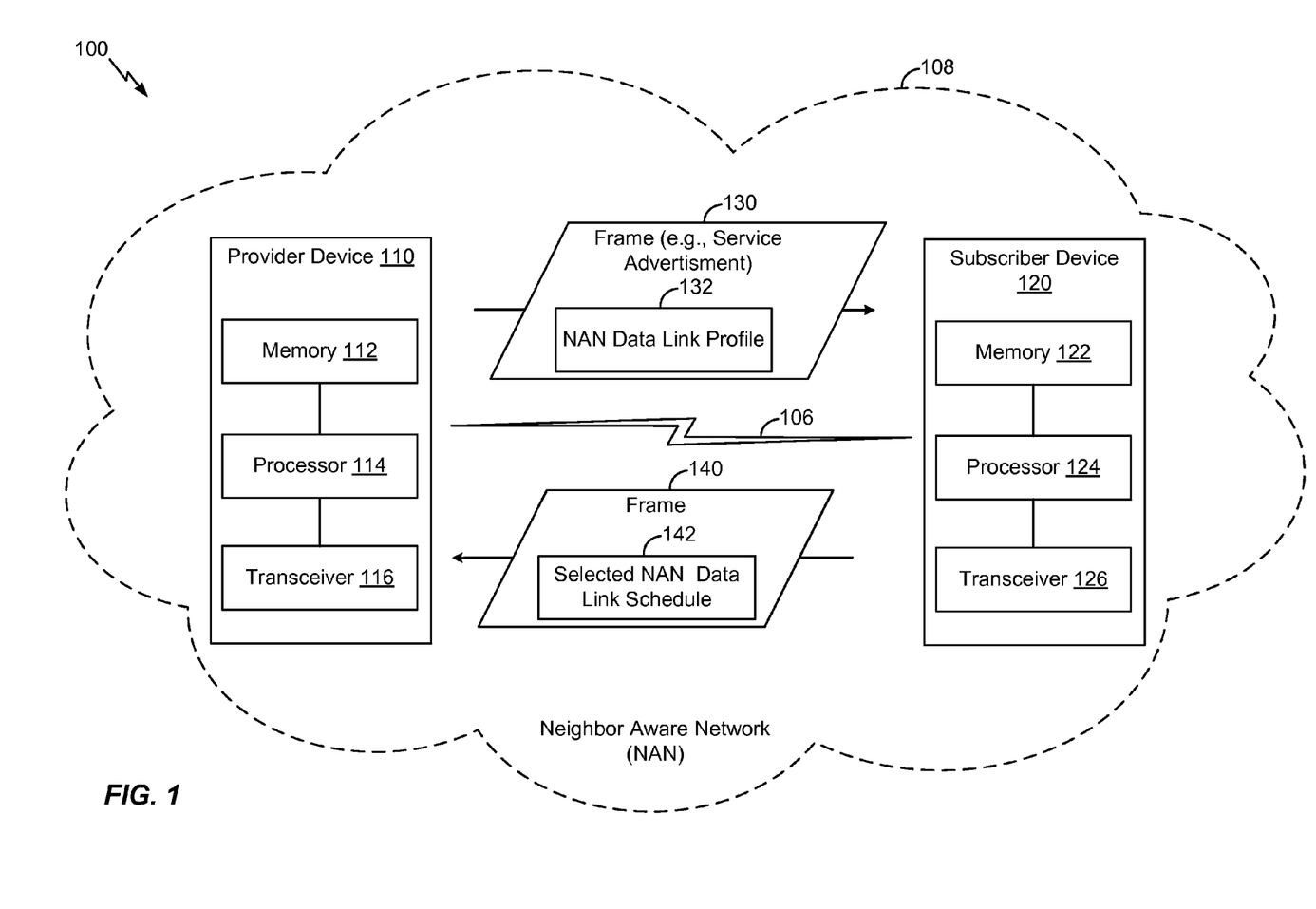
FIG. 1 is a diagram that illustrates a system that is operable to enable selection of a Neighbor Aware Network (NAN) data link profile for a service.

Referring to FIG. 1, a system 100 that is operable to enable selection of a NAN data link profile for a service is shown. The system 100 includes a provider device 110 and a subscriber device 120 that are participating in a NAN 108. Although FIG. 1 depicts two devices 110, 120, the system 100 or the NAN 108 may include more than two devices. One or more of the devices 110, 120 may operate in compliance with one or more Institute of Electrical and Electronics Engineers (IEEE) 802.11 protocols. As non-limiting examples, the devices 110, 120 may operate in compliance with an IEEE 802.11ai protocol, an IEEE 802.11v protocol, an IEEE 802.11b protocol, etc.

In some implementations, one or more of the devices 110, 120 may be a node of a wireless network. For example, one or more of the devices 110, 120 may be an IEEE 802.11 access point that supports and/or manages a corresponding wireless data network. To illustrate, the provider device 110 may support a first network, and the subscriber device 120 may access the first network via a service provided by the provider device 110.

The provider device 110 includes a memory 112, a processor 114, and a transceiver 116. The provider device 110 may be configured to execute an application to provide a service to one or more other devices of the NAN 108 via a NAN data link. As a non-limiting example, the provider device 110 may provide a file transfer service to subscriber device 120 or may provide a video conferencing service to the subscriber device 120. As other non-limiting examples, the provider device 110 may provide internet services, gaming services, streaming video services, streaming audio services, etc. It should be understood that the present disclosure is not limited to the above-identified services.

To notify other devices of the NAN 108 of the service, the provider device 110 may transmit a frame 130 that includes a service advertisement. For example, the service advertisement may indicate properties and/or characteristics of the service and/or of the provider device 110. After receiving the frame 130, the subscriber device 120 may use the properties and/or characteristics indicated in the frame 130 to subscribe to the service. As shown in FIG. 1, the frame 130 may include data indicating a NAN data link profile 132. The NAN data link profile 132 may correspond to a set of NAN data link schedules that satisfy transmission parameters of the service. The provider device 110 may select the NAN data link profile 132 for the service from a plurality of NAN data link profiles. Alternately, an application executing at the provider device 110 may specify that a particular NAN data link profile, such as the NAN data link profile 132, be used to provide the service.

Different NAN data link profiles may be used for different services/applications. As a non-limiting example, a file transfer service may utilize a first NAN data link profile that corresponds to NAN data link schedules supporting "high" latency transmissions, and a video conferencing service may utilize a second NAN data link profile that corresponds to NAN data link schedules supporting "low" latency transmissions. It should be understood that latency is only one transmission parameter considered in developing NAN data link schedules and is used solely as an illustrative example. Other transmission parameters, such as throughput and connectivity topology, may also be considered in developing NAN data link schedules.

Figure 2:
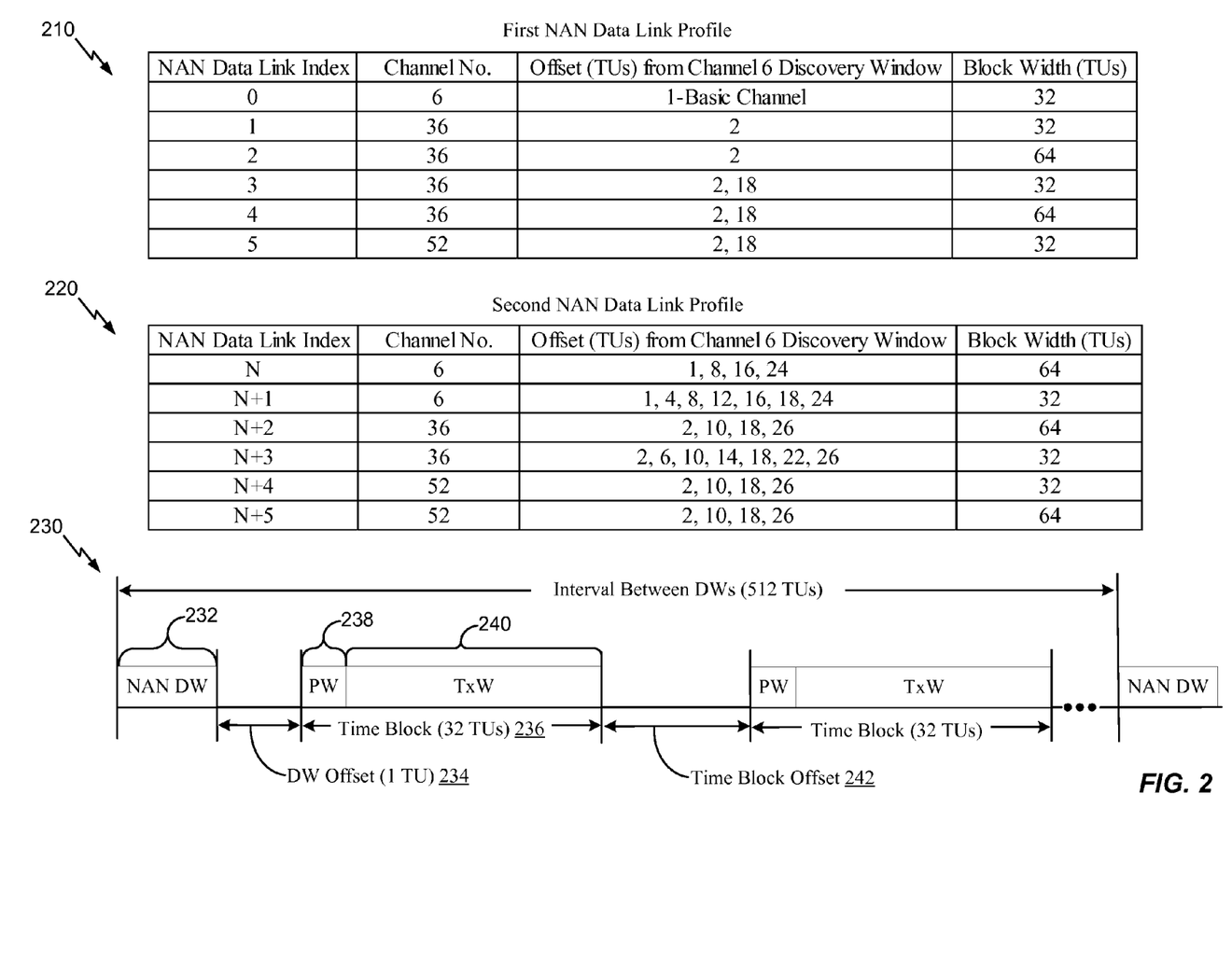
FIG. 2 illustrates a first NAN data link profile and a second NAN data link profile.

Referring FIG. 2, examples of a first NAN data link profile 210 and a second NAN data link profile 220 are shown. According to one implementation, the first NAN data link profile 210 may correspond to a high latency NAN data link profile, and the second NAN data link profile 220 may correspond to a low latency NAN data link profile. For example, the first NAN data link profile 210 may be selected by the provider device 110 of FIG. 1 for a service that tolerates high latency on a NAN data link, such as a file transfer service, and the second NAN data link profile 220 may be selected by the provider device 110 for a service that "requires" low latency on a NAN data link, such as a video conferencing service.

The first NAN data link profile 210 may correspond to a set of NAN data link schedules. To illustrate, the first NAN data link profile 210 may include six NAN data link schedules, wherein each NAN data link schedule is referred to by a "NAN Data Link Index". For example, a first NAN data link schedule in the first NAN data link profile 210 is referenced to by NAN Data Link Index "0", a second NAN data link schedule in the first NAN data link profile 210 is referenced to by NAN Data Link Index "1", etc. Although six NAN data link schedules are associated with the first NAN data link profile 210 in FIG. 2, in other implementations, additional or fewer NAN data link schedules may be associated with the first NAN data link profile 210.

Similarly, the second NAN data link profile 220 may also correspond to a set of NAN data link schedules. To illustrate, the second NAN data link profile 220 may also comprise six NAN data link schedules, where each NAN data link schedule is referred to by a "NAN Data Link Index". For example, a first NAN data link schedule in the second NAN data link profile 220 is referenced to by NAN Data Link Index "N", a second NAN data link schedule in the second NAN data link profile 220 is referenced to by NAN Data Link Index "N+1", etc. Although six NAN data link schedules are associated with the second NAN data link profile 220 in FIG. 2, in other implementations, additional or fewer NAN data link schedules may be associated with the second NAN data link profile 220.

Each NAN data link schedule in the NAN data link profiles 210, 220 may indicate a channel number of the associated NAN data link, an offset of a time block from a discovery window (DW) of a basic channel, and a block width of the time blocks. The offset and the block width may be expressed in time units (TUs). According to one implementation, one time unit may correspond to one millisecond (ms). The information indicated by each NAN data link schedule may indicate a transmission schedule of a NAN data link. For example, the provider device 110 and the subscriber device 120 may communicate on a NAN data link based on one of the transmission schedules of the selected NAN data link profile 210, 220.

An exemplary example of a transmission schedule 230 of a NAN data link is provided. In the illustrative example, the transmission schedule 230 may correspond to the first NAN data link schedule in the first NAN data link profile 210. For example, the transmission schedule 230 may correspond to a schedule on the basic channel, such as channel 6. The transmission schedule 230 may include or indicate a NAN discovery widow (NAN DW) 232. During the NAN discovery window 232, the provider device 110 of FIG. 1 may send the frame 130 or service advertisement. In some implementations, the frame 130 may be a broadcast frame, a multicast frame, or a unicast frame. An illustrative non-limiting example of a broadcast frame is a beacon frame.

After the NAN discovery window 232, the transmission schedule 230 indicates that there is an offset period 234, such as an idle period, where there are no transmissions on the NAN data link. As indicated by the first NAN data link schedule in the first NAN data link profile 210, the offset period 234 from the NAN discovery window 232 is approximately one time unit. After the offset period 234, the transmission schedule 230 indicates that there is a time block 236 that includes a paging window (PW) 238 and a transmission window (TxW) 240. As indicated by the first NAN data link schedule in the first NAN data link profile 210, the time block 236 is approximately 32 time units. The paging window 238 may correspond to a window that enables a device, such as the provider device 110 or the subscriber device 120, to indicate that data will be transmitted during the following transmission window 240.

A time block offset 242 may follow the time block 236. Although not explicitly shown in the first NAN data link schedule in the first NAN data link profile 210, the time block offset 242 may also be indicated in the first NAN data link schedule in the first NAN data link profile 210. Another time block may follow the time block offset 242 on the NAN data link according to the transmission schedule 230. Thus, the NAN data link may alternate between time block offsets and time blocks until the next NAN discovery window occurs. According to the transmission schedule 230, a NAN discovery window occurs approximately every 512 time units (or every 512 ms) on the NAN data link.

As explained above, the first NAN data link profile 210 may correspond to a high latency NAN data link profile, such as a NAN data link profile for file transfer services. Thus, each NAN data link schedule indicated in the first NAN data link profile 210 may have relatively long time block offsets between time blocks and/or may have relatively long transmission window for an increased throughput. As described below, each device 110, 120 in FIG. 1 may be compatible with (or capable of using) particular NAN data link schedules and a negotiation process between the devices 110, 120 may be performed to select the NAN data link schedule after the provider device 110 sends data indicating a NAN data link profile.

Also, as explained above, the second NAN data link profile 220 may correspond to a low latency NAN data link profile, such as a NAN data link profile for video conferencing services or other services requiring a short response time. Thus, in general, each NAN data link schedule indicated in the second NAN data link profile 220 may have relatively short time block offsets between time blocks.

The NAN data link profiles 210, 220 of FIG. 2 (and the corresponding NAN data link schedules) may be standardized to improve efficiency in selecting a NAN data link schedule for a particular service or application. To illustrate, the NAN data link profiles 210, 220 may be stored in tables associated with a NAN data link protocol stack. The provider device 110 and/or the subscriber device 120 may select a NAN data link schedule from sets of "pre-defined" NAN data link schedules, as opposed to creating a transmission schedule for each service.

Referring back to FIG. 1, the provider device 110 may be configured to select the NAN data link profile 132 for the service offered. For example, the provider device 110 may select the first NAN data link profile 210 as the NAN data link profile 132 if the service being advertised is a file transfer service, and the provider device 110 may select the second NAN data link profile 220 as the NAN data link profile 132 if the service being advertised is a video conferencing service.

In some implementations, selection of the NAN data link profile 132 may be based at least in part on a power attribute of the provider device 110. To illustrate, if the provider device 110 is battery powered, power conservation may be a factor in selecting a NAN data link profile. As a non-limiting example, the provider device 110 may select a NAN data link profile having NAN data link schedules that indicate relatively long power save periods for the provider device 110 and relatively short active periods for the provider device 110.

In a particular aspect, each service may be assigned a NAN data link profile based on transmission parameters (or attributes) of the service. One example of a transmission parameter may include a latency parameter. The video conferencing service (or other voice/video services) may require a relatively low latency, while the file transfer service (or other "browser-type" services) may tolerate a relatively high latency. Another example of a transmission parameter may include a throughput parameter. The video conferencing service may require a relatively low throughput. For example, voice packets may be relatively small in size and may be communicated frequently on the NAN data link to achieve a relatively low throughput. Conversely, the file transfer service may prefer a relatively high throughput. For example, relatively large data packets may be communicated on the NAN data link for the file transfer service.

Another example of a transmission parameter may be a connectivity topology. For example, different NAN data link profiles may be better suited for different connectivity topologies. In the scenario of a video conferencing service, a first video conferencing NAN data link profile may include NAN data link schedules customized for a "one-to-one" connectivity topology, such as a voice or video chat between two peers or between the two devices 110, 120. A second video conferencing NAN data link profile may include NAN data link schedules customized for a "one-to-many" connectivity topology, such as a single source broadcast. A third video conferencing NAN data link profile may include NAN data link schedules customized for a "many-to-many" connectivity topology, such as a group chat or multi-user interactive gaming.

Each service may be statically assigned a NAN data link profile or may be assigned a NAN data link profile at runtime. The method in which a particular service is assigned a NAN data link profile may be based on the capabilities of the provider device 110. For example, if the provider device 110 has limited processing capabilities, such as software capabilities or central processing unit (CPU) capabilities, the particular service may be statically assigned the NAN data link profile 132. However, if the provider device 110 has significant processing capabilities, the particular service may be assigned the NAN data link profile 132 at runtime. For example, at runtime, the provider device 110 may determine one or more transmission parameters of the service and select the NAN data link profile 132 based on the transmission parameters. According to one implementation, to save energy associated with assigning the particular service the NAN data link profile 132 at runtime, the particular service may be statically assigned the NAN data link profile 132 if the provider device 110 is battery powered.

According to one implementation, a service may specify the corresponding NAN data link profile 132 when the service is executed at the provider device 110. To illustrate, if the provider device 110 initiates the file sharing service, the file sharing service may include data that specifies to the processor 114 that the first NAN data link profile 210 is to be used and transmitted in the frame 130. If the provider device 110 initiates the video conferencing service, the video conferencing service may include data that specifies to the processor 114 that the second NAN data link profile 220 is to be used and transmitted in the frame 130.

In another particular aspect, a NAN data link profile may be associated with a category indicating particular features of the NAN data link schedules of the NAN data link profile. For example, a particular NAN data link profile may be designated a "voice capable" profile. In this example, each NAN data link schedule of the particular NAN data link profile may be appropriate to use for voice communications. Thus, an application that provides a voice communication service can designate use of the particular NAN data link profile by indicating that the application provides a voice service or by indicating use of a voice communication capable NAN data link profile.

Software at the provider device 110, such as instructions in the memory 112 executable by the processor 114 or a NAN engine, may provide feedback to the service indicating whether "requirements" for the selected NAN data link profile may be satisfied. For example, if the video conferencing service specifies that the provider device 110 use the second NAN data link profile 220, the software at the provider device 110 may determine whether network conditions permit usage of the second NAN data link profile 220. For example, if the provider device 110 is an area with poor signal coverage, the provider device 110 may not be able to establish a NAN data link having the low latency parameters of the second NAN data link profile 220. In such scenarios, the software may provide the service with an option to allow use of a different NAN data link profile, such as a NAN data link profile that is compatible with the network conditions. As a non-limiting example, the software at the provider device 110 may select a NAN data link profile supporting higher latency than the second NAN data link profile 220. In another example, the software may select a particular NAN data link schedule from the NAN data link profile to use to provide the service. In this example, the frame 130 may indicate the particular NAN data link schedule selected by the software. For example, the NAN data link profile 132 may include an identifier of a particular NAN data link profile as well as an identifier of a particular NAN data link index within the NAN data link profile.

According to another implementation, a service may specify attributes of the service, such as transmission parameters and/or a traffic type of the service, when the service is executed at the provider device 110. To illustrate, if the provider device 110 initiates the file sharing service, the file sharing service may include data indicating throughput parameters for the file sharing service, latency parameters for the file sharing service, a connectivity topology associated with the file sharing service, a traffic type of the file sharing service, etc. The software at the provider device 110 may map the file sharing service to the first NAN data link profile 210 based on the attributes of the service.

If the service fails to provide each attribute used to determine the NAN data link profile 132, the software at the provider device 110 may generate the missing attributes based on default values or average values (or "mid-point" values) of the missing attributes. To illustrate, if the file sharing service includes data indicating throughput parameters for the file sharing service but fails to provide data indicating the latency parameters, the software at the provider device 110 may generate a latency parameter by taking an average latency value or a default latency value.

If a particular service fails to provide any attributes used to determine the NAN data link profile, the software at the provider device 110 may select a default NAN data link profile. For example, the default NAN data link profile may have scheduling parameters that satisfy a median latency, a median throughput, and a "many-to-many" connectivity topology. In this example, the default NAN data link profile may correspond to an NAN data link schedule that supports mid-point values for each attribute to provide "balanced" transmissions in all respects. In some scenarios, the default NAN data link profile may be used for "legacy" services/applications, such as services/applications that were not developed based on Neighbor Aware Networking.

If the service only provides the traffic type, the software at the provider device 110 may select a NAN data link profile based on a service having a similar traffic type. For example, if the service indicates that the traffic type corresponds to voice packets, the provider device 110 may select the second NAN data link profile 220 that is associated with the video conferencing service. The video conferencing service may utilize voice packets. In some implementations, the software at the provider device 110 may learn the traffic type based on packet size, a frequency of packet transmission, a Type of Service (ToS) field in a Media Access Control (MAC) header, a port number associated with a packet, etc.

Thus, in some implementations, the software at the provider device 110 may adaptively learn the transmission parameters (or attributes) of the service and may re-map the service to a NAN data link profile based on the learned attributes. The provider device 110 may include a NAN engine. Attributes of legacy services/applications may be adaptively learned by observing types and rates of data exchanged and/or by communication indicators, such as packet loss, buffer underflow, etc. The software at the provider device 110 may re-map the legacy services/applications to corresponding NAN data link profiles that satisfy the attributes. In some scenarios, the re-mapped NAN data link profiles may be saved for future use of the services/applications.

In some scenarios, re-mapping may be triggered based on "learning" about a change in surroundings, such as a change in network conditions, concurrency with other networks, external interference, etc. As a non-limiting example, multiple devices may participate in an interactive gaming service while out in a remote location, such as a location away from power sources. In this example, an initially selected NAN data link profile may be selected to facilitate high throughput to provide an excellent gaming experience. However, the initially selected NAN data link profile may result in a relatively large battery drain at the devices. For example, the NAN data link schedule of the initial NAN data link profile may result in long active periods for the devices and short power save periods. As battery drain of the devices becomes detectable, software at the devices may re-map to a NAN data link profile that is more power efficient to conserve battery power, such as a NAN data link profile resulting in shorter active periods and longer power save periods. In some scenarios, the re-mapped NAN data link profile may be purged after the network conditions change. For example, if the devices connect to a power source, the re-mapped NAN data link profile may be purged. The software may also re-map based on the number of users (or other devices) joining the interactive gaming service. For example, the software may also re-map based on the connectivity topology.

According to another implementation, a service may be registered with a database. For example, the database may include information indicating a specific NAN data link profile of the service, information indicating attributes of the service, information indicating a traffic type of the service, or a combination thereof. In some implementations, the database may be associated with a remote server, such as a cloud computing device, or another central entity that is accessible by the provider device 110. If the specific NAN data link profile of the service is included in the database, the provider device 110 may download the NAN data link profile 132 of the service upon installation of the service, such as when the service is installed at the provider device 110. The NAN data link profile may be retrieved from the database when the service is executed. If information indicating attributes and/or the traffic type of the service is included in the database, the provider device 110 may cache the information (or a mapping of the information to a NAN data link profile) in a local registry, such as the memory 112. The processor 114 may retrieve the information from the memory 112 when the service is initiated, and may map the information to the NAN data link profile 132 after retrieving the information.

In some implementations, a new NAN-aware service may be associated with a specific NAN data link profile during installation at the provider device 110. The provider device 110 may use the specific NAN data link profile for the new NAN-aware service each time that the new NAN-aware service is initiated.

According to some implementations, the NAN data link profile 132 may indicate how the service was discovered. For example, the NAN data link profile 132 may include information indicating whether the service was discovered using NAN, Bluetooth®, Bluetooth® Low Energy (BLE), ZigBee®, another low-power network, etc. Bluetooth® is a registered trademark licensed to Bluetooth SIG, INC of Kirkland, Wash. ZigBee® is a registered trademark licensed to ZigBee Alliance Corporation of San Ramon, Calif. Thus, in particular implementations, the NAN data link profile 132 may indicate how service discovery was performed.

The subscriber device 120 comprises a memory 122, a processor 124, and a transceiver 126. Upon receiving the frame 130, the subscriber device 120 may be configured to subscribe to the service and to select a particular NAN data link schedule from the set of NAN data link schedules corresponding to the NAN data link profile 132. To illustrate, if the NAN data link profile 132 corresponds to the first NAN data link profile 210 of FIG. 2, the subscriber device 120 may select one of the NAN data link schedules corresponding to the first NAN data link profile 210 for use in establishing a NAN data link 106 with the provider device 110. For example, if the subscriber device 120 selects the first NAN data link schedule of the first NAN data link profile 210, the processor 124 may generate a frame 140 that includes the selected NAN data link schedule 142, and the transceiver 126 may transmit the frame 140 to the provider device 110. After receiving the frame 140, the provider device 110 and the subscriber device 120 may communicate via the NAN data link 106 using the selected NAN data link schedule 142.

In some implementations, each device 110, 120 may be capable of using multiple NAN data link schedules and a negotiation process between the devices 110, 120 may be performed to select the NAN data link schedule. For example, the subscriber device 120 may be compatible with the first, second, and third NAN data link schedules of the first NAN data link profile 210, and the provider device 110 may be compatible with the third, fourth, and fifth NAN data link schedules of the first NAN data link profile 210. Through a series of frame exchanges between the devices 110, 120, such as a two-way handshake or a four-way handshake, the devices 110, 120 may determine a NAN data link schedule that accommodates the processing capabilities of both devices 110, 120. For example, the devices 110, 120 may communicate data via the NAN data link 106 using the third NAN data link schedule of the first NAN data link profile 210 after the negotiation process because both devices 110, 120 are compatible with the third NAN data link schedule.

In some implementations, the negotiation process may be based on connectivity topology information associated with the service. For example, a "many-to-many" connectivity topology may cause a NAN data link schedule having a relatively large discovery window (DW) and/or a relatively large transmission window (TxW) to be selected to accommodate time for each device to receive and transmit data packets.

According to some implementations, the NAN data link profile 132 may include information indicating a scheme for schedule negotiations between the provider device 110 and the subscriber device 120. The scheme may be based on the service that is advertised by the provider device 110 and/or based on connectivity topology information associated with the service.

To illustrate, a NAN data link profile for a service having a one-to-one connectivity topology, such as a two-way voice call, may include information indicating that the provider device 110 will negotiate with the subscriber device 120 to select a particular NAN data link schedule in the NAN data link profile. Because only two devices 110, 120 are used for a one-to-one connectivity topology, there may be a relatively high degree of flexibility in selecting a NAN data link schedule.

A NAN data link profile for a service having a one-to-many connectivity topology, such as a single source broadcast, may include information indicating that the provider device 110 will not negotiate with subscriber devices to select a NAN data link schedule in the NAN data link profile. Instead, the provider device 110 may offer a "take it or leave it" NAN data link schedule. For example, the provider device 110 may select a particular NAN data link schedule in the NAN data link profile. After a NAN data link schedule is selected, the subscriber device 120 may communicate with the provider device 110 based on the selected NAN data link schedule or discontinue association with the provider device 110 with respect to the service. Because multiple subscriber devices are used for a one-to-many connectivity topology, it may be difficult for the provider device 110 to negotiate with each subscriber device to identify a NAN data link schedule that is compatible with each subscriber device and the provider device 110. Thus, the provider device 110 may select a NAN data link schedule, and each subscriber device may determine whether to subscribe to the service based on the selected NAN data link schedule.

A NAN data link profile for a service having a many-to-many connectivity topology, such as a multi-party gaming service or a multi-party chat, may also include information indicating that the provider device 110 will not negotiate with subscriber devices regarding the selection of a NAN data link schedule. Although a service supporting a many-to-many connectivity topology may be initiated as a one-to-one connectivity topology, it is possible for other devices to subscribe to the service at a later time. Thus, it may be difficult to negotiate a NAN data link schedule that is "compatible" with each subscribing service as additional devices subscribe to the service. For many-to-many connectivity, the provider device 110 may select a NAN data link schedule, and subscribing devices may communicate based on the selected NAN data link schedule or discontinue association with the provider device 110 with respect to the service.

The system 100 of FIG. 1 may enable the devices 110, 120 to communicate using a standardized NAN data link schedule based on transmission parameters of a service/application. Using a standardized NAN data link schedule may improve efficiency in selecting a NAN data link schedule for a particular service or application. For example, the provider device 110 and/or the subscriber device 120 may select a NAN data link schedule from sets of "pre-defined" NAN data link schedules, as opposed to creating random transmission schedules for each service. Additionally, including information identifying a NAN data link profile in a message advertising an available service may reduce overhead messaging associated with a provider device and a subscriber device selecting a NAN data link schedule.

Figure 3:
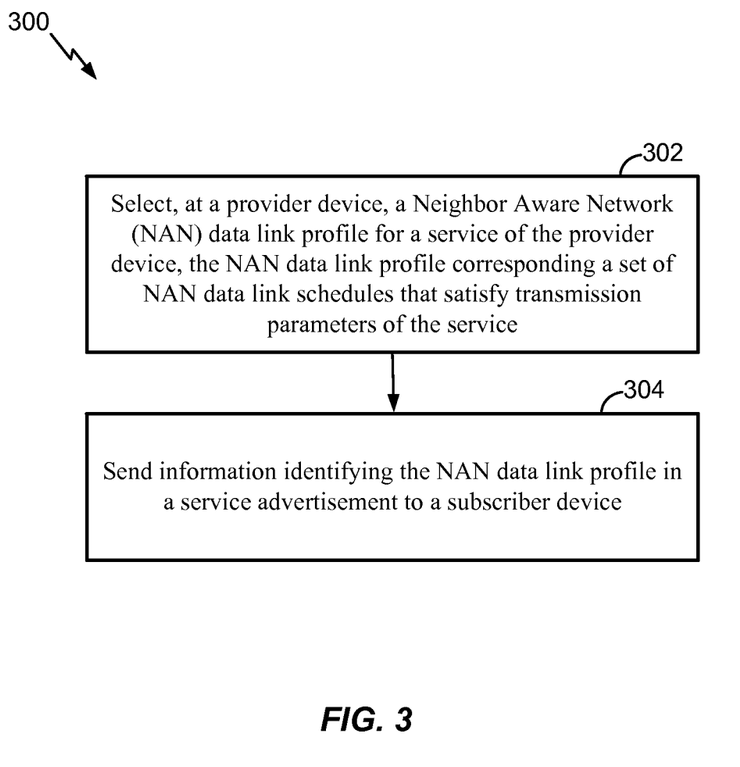
FIG. 3 is a flow diagram of a method for selecting a data link schedule.

Referring to FIG. 3, a method 300 for selecting a data link schedule is shown. The method 300 may be performed at the provider device 110 of FIG. 1.

The method 300 includes selecting, at a provider device, a NAN data link profile for a service of the provider device, at 302. The NAN data link profile may correspond to a set of NAN data link schedules that satisfy transmission parameters of the service. The transmission parameters may include at least one of a latency parameter, a throughput parameter, a parameter indicating a connectivity topology associated with the service, or a combination thereof. For example, referring to FIG. 1, the provider device 110 may select the NAN data link profile 132 for the service being offered. For example, the provider device 110 may select the first NAN data link profile 210 as the NAN data link profile 132 if the service being advertised is a file transfer service, and the provider device 110 may select the second NAN data link profile 220 as the NAN data link profile 132 if the service being advertised is a video conferencing service.

Information identifying the NAN data link profile may be sent in a service advertisement to a subscriber device, at 304. For example, referring to FIG. 1, the provider device 110 may advertise the frame 130 that includes the information identifying the NAN data link profile 132 to the subscriber device 120.

According to one implementation of the method 300, the NAN data link profile is selected from a plurality of NAN data link profiles. According to one implementation, a default NAN data link profile may be selected for a particular service if the particular service fails to specify transmission parameters. The default NAN data link profile corresponds to a default NAN data link schedule having scheduling parameters that satisfy a median latency, a median throughput, and a many-to-many connectivity topology.

According to one implementation, the method 300 may include receiving, from the subscriber device, an indication of one or more NAN data link schedules in the set of NAN data link schedules that are compatible with the subscriber device. The method 300 may also include selecting, at the first device, a particular NAN data link schedule from the one or more NAN data link schedules that is compatible with the first device. As used herein with respect to the method 300, the "first device" and the "provider device" may correspond to the same device. The method 300 may further include transmitting data to the subscriber device based on the particular NAN data link schedule.

According to the method 300, selecting the NAN data link profile may include determining attributes of the service. The attributes of the service may include transmission parameters of the service, a traffic type of the service, or a combination thereof. Selecting the NAN data link profile may also include mapping the attributes of the service to the NAN data link profile.

According to one implementation, the method 300 may also include detecting a change in network conditions and selecting a second NAN data link profile for the service based on the change in network conditions. The method 300 may also include purging the second NAN data link profile after a session with the service is complete or storing the second NAN data link profile for future sessions after the session with the service is complete.

According to one implementation, the method 300 may include selecting a particular NAN data link schedule from a second set of NAN data link schedules corresponding to a second NAN data link profile. The second NAN data line profile may be associated with a second service. Each NAN data link schedule in the second set of NAN data link schedules may satisfy second transmission parameters of the second service. The method 300 may also include transmitting data to a second device based on the particular NAN data link schedule. The second transmission parameters may include at least one of a second latency parameter, a second throughput parameter, or a second parameter indicating a connectivity topology associated with the second service. The particular NAN data link schedule may be compatible with the first device.

Figure 4:
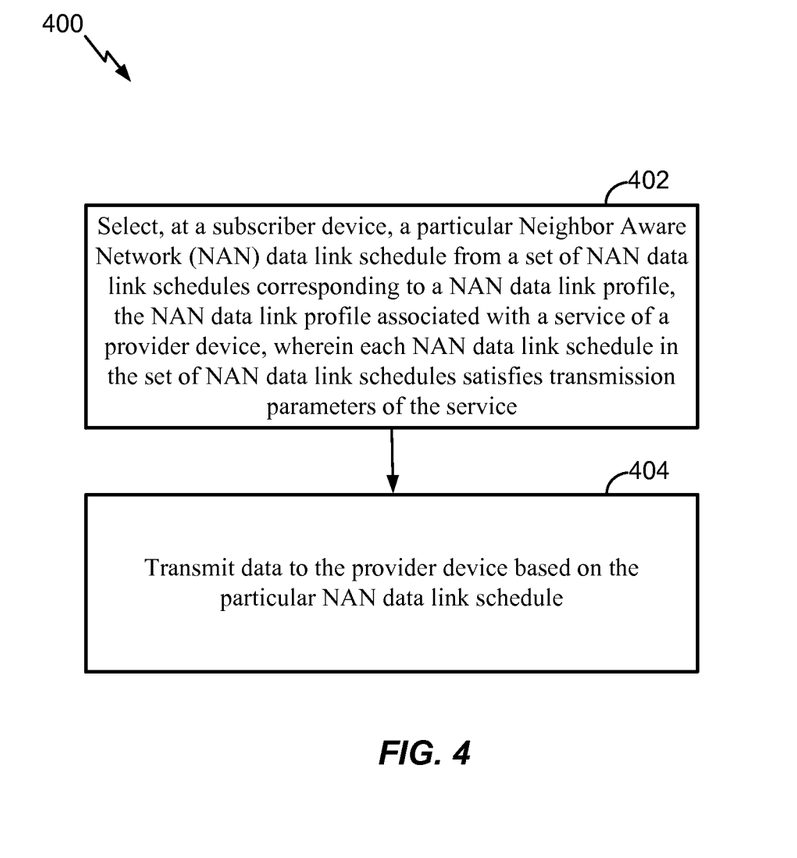
FIG. 4 is a flow diagram of a method for subscribing to a service.

Referring to FIG. 4, a method 400 for subscribing to a service is shown. The method 400 may be performed at the subscriber device 120 of FIG. 1.

The method 400 includes selecting, at a subscriber device, a particular NAN data link schedule from a set of NAN data link schedules corresponding to a NAN data link profile, at 402. The NAN data link profile may be associated with a service of a provider device, and each NAN data link schedule of the set of NAN data link schedules may satisfy transmission parameters of the service. For example, referring to FIG. 1, upon receiving the frame 130, the subscriber device 120 may subscribe to the service and select a particular NAN data link schedule from the set of NAN data link schedules corresponding to the NAN data link profile 132.

To illustrate, if the NAN data link profile 132 corresponds to the first NAN data link profile 210 of FIG. 2, the subscriber device 120 may select one of the NAN data link schedules corresponding to the first NAN data link profile 210 to use for establishing the NAN data link 106 with the provider device 110. If the subscriber device 120 selects the first NAN data link schedule of the first NAN data link profile 210, the processor 124 may generate the frame 140 that includes the selected NAN data link schedule 142, and the transceiver 126 may transmit the frame 140 to the provider device 110.

Data may be transmitted to the provider device based on the particular NAN data link schedule, at 404. For example, referring to FIG. 1, the subscriber device 120 may transmit data identifying a selected NAN data link schedule 142 to the provider device 110. The selected NAN data link schedule 142 may be one of the NAN data link schedules associated with the NAN data link profile identified by the provider device 110.

Figure 5:
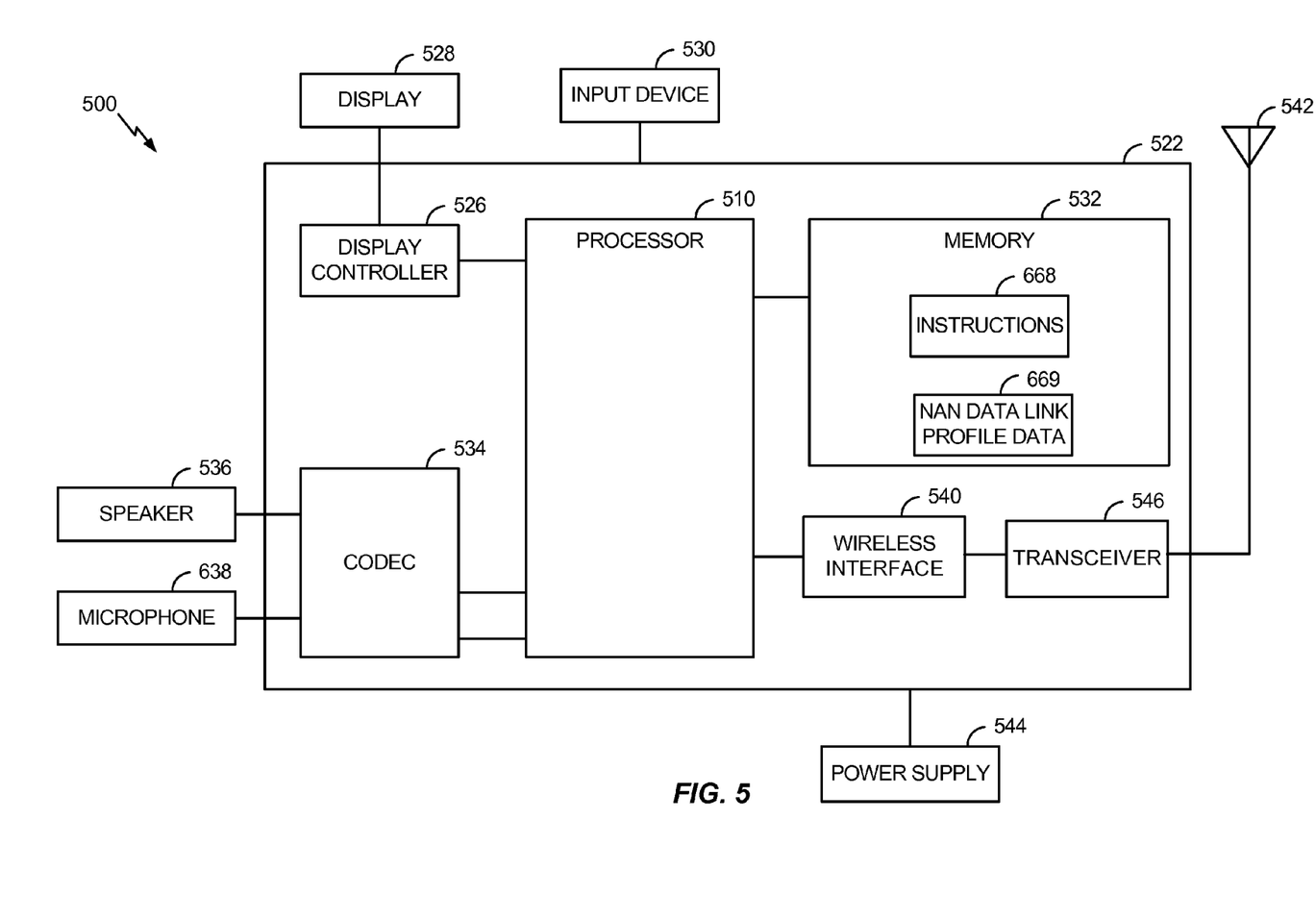
FIG. 5 is a diagram of a wireless device that is operable to support various implementations of one or more methods, systems, apparatuses, and/or computer-readable media disclosed herein.

Referring to FIG. 5, a device is depicted and generally designated 500. The device 500 may correspond to the provider device 110 of FIG. 1 or to the subscriber device 120 of FIG. 1. The device 500 includes a processor 510, such as a digital signal processor or central processing unit, coupled to a memory 532.

The processor 510 may correspond to the processor 114 of FIG. 1 or the processor 124 of FIG. 1. The processor 510 may be configured to execute software, such as a program of one or more instructions 568, stored in the memory 532. Additionally or alternatively, the processor 510 may be configured to execute one or more instructions stored in a memory of a wireless interface 540, such as an IEEE 802.11 interface configured to operate in accordance with an IEEE 802.11 standard. In some implementations, the processor 510 may be configured to operate in accordance with the method 300 of FIG. 3 or the method 400 of FIG. 4. For example, the memory 532 may include NAN data link profile data 669. The NAN data link profile data 669 may include one or more tables or other data structures indicating a set of NAN data link schedules associated with one or more NAN data link profiles, NAN data link profiles associated with various application, or other information used to select a particular NAN data link profile or a particular NAN data link schedule. If the device 500 is a provider device, the processor 510 may select a NAN data link profile for a service of the device 500 based on the NAN data link profile data 669. Alternatively, if the device 500 is a subscriber device, the processor 510 may select a NAN data link schedule from a set of NAN data link schedules corresponding to a NAN data link profile based on the NAN data link profile data 669.

The wireless interface 540 may be coupled to the processor 510 and to an antenna 542. For example, the wireless interface 540 may be coupled to the antenna 542 via a transceiver 546. The transceiver 546 may correspond to the transceiver 116 of FIG. 1 or the transceiver 126 of FIG. 1. In some implementations, the transceiver 546 may be configured to operate in accordance with the method 300 of FIG. 4 or the method 400 of FIG. 4. For example, the transceiver 546 may send information identifying a NAN data link profile to a subscriber device in a service advertisement if the device 500 is a provider device, according to the method 300 of FIG. 3. The transceiver 546 may also transmit data to the provider device based on a selected NAN data link schedule if the device 500 is a subscriber device, according to the method 400 of FIG. 4.

A coder/decoder (CODEC) 534 can also be coupled to the processor 510. A speaker 536 and a microphone 538 can be coupled to the CODEC 534. A display controller 526 can be coupled to the processor 510 and to a display device 528. In a particular implementation, the processor 510, the display controller 526, the memory 532, the CODEC 534, and the wireless interface 540 are included in a system-in-package or system-on-chip device 522. In a particular implementation, an input device 530 and a power supply 544 are coupled to the system-on-chip device 522. Moreover, in a particular implementation, as illustrated in FIG. 5, the display device 528, the input device 530, the speaker 536, the microphone 538, the antenna 542, and the power supply 544 are external to the system-on-chip device 522. However, each of the display device 528, the input device 530, the speaker 536, the microphone 538, the antenna 542, and the power supply 544 can be coupled to one or more components of the system-on-chip device 522, such as one or more interfaces or controllers.

In conjunction with the described techniques, a first apparatus includes means for selecting a NAN data link profile for a service. The NAN data link profile may correspond to a set of NAN data link schedules that satisfy transmission parameters of the service. For example, the means for selecting may include the processor 114 of FIG.

1, the processor 510 programmed to execute the instructions 568 of FIG. 5, one or more other devices, circuits, modules, or any combination thereof.

The first apparatus may also include means for sending the NAN data link profile in a service advertisement to a subscriber device. For example, the means for sending may include the transceiver 116 of FIG. 1, the transceiver 546 of FIG. 5, one or more other devices, circuits, modules, or any combination thereof. To illustrate, the means for selecting and the means for sending may be included in the provider device.

In conjunction with the described techniques, a second apparatus includes means for selecting a particular NAN data link schedule from a set of NAN data link schedules corresponding to a NAN data link profile. The NAN data link profile may be associated with a service, and each NAN data link schedule in the set of NAN data link schedules may satisfy transmission parameters of the service. For example, the means for selecting may include the processor 124 of FIG. 1, the processor 510 programmed to execute the instructions 568 of FIG. 5, one or more other devices, circuits, modules, or any combination thereof.

The second apparatus may also include means for transmitting data to the provider device based on the particular NAN data link schedule. For example, the means for transmitting may include the transceiver 126 of FIG. 1, the transceiver 546 of FIG. 5, one or more other devices, circuits, modules, or any combination thereof. To illustrate, the means for selecting and the means for transmitting may be included in the subscriber device.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (or non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A first device comprising:
a processor;
a memory storing instructions executable to cause the processor to perform operations comprising:
selecting a Neighbor Aware Network (NAN) data link profile for a service, the NAN data link profile corresponding to a set of NAN data link schedules that satisfy transmission parameters of the service, wherein a default NAN data link profile is selected for a particular service if the particular service fails to specify transmission parameters, and wherein the default NAN data link profile corresponds to a default NAN data link schedule having scheduling parameters that satisfy a median latency, a median throughput, and a many-to-many connectivity topology; and
sending the NAN data link profile in a service advertisement to a subscriber device.

2. The first device of claim 1, wherein the NAN data link profile is selected from a plurality of NAN data link profiles.

3. The first device of claim 1, wherein the transmission parameters include at least one of a latency parameter, a throughput parameter, a parameter indicating a connectivity topology associated with the service, or a combination thereof.

4. The first device of claim 1, wherein the NAN data link profile is selected based at least in part on a power attribute of the first device.

5. The first device of claim 1, wherein the operations further comprise:
receiving, from the subscriber device, an indication of one or more NAN data link schedules in the set of NAN data link schedules that are compatible with the subscriber device;
selecting, at the first device, a particular NAN data link schedule from the one or more NAN data link schedules that is compatible with the first device; and
transmitting data to the subscriber device based on the particular NAN data link schedule.

6. The first device of claim 1, wherein the NAN data link profile is statically assigned to the service, assigned to the service at runtime, or assigned to the service when the service is installed at the first device.

7. The first device of claim 1, wherein selecting the NAN data link profile comprises:
identifying the transmission parameters of the service based on indicators when the service is executed by the processor; and
mapping the transmission parameters to the NAN data link profile.

8. The first device of claim 1, wherein selecting the NAN data link profile comprises:
determining attributes of the service, wherein the attributes of the service include the transmission parameters of the service, a traffic type of the service, or a combination thereof; and mapping the attributes of the service to the NAN data link profile.

9. The first device of claim 1, wherein the operations further comprise:
   detecting a change in network conditions;
   selecting a second NAN data link profile for the service based on the change in network conditions; and
   after a session with the service is complete:
      purging the second NAN data link profile; or
      storing the second NAN data link profile for future sessions.

10. The first device of claim 1, wherein selecting the NAN data link profile comprises retrieving the NAN data link profile from a database, and wherein the NAN data link profile is retrieved from the database when the service is executed by the processor or when the service is installed at the first device.

11. The first device of claim 10, wherein the database is included in a cloud computing device.

12. The first device of claim 1, wherein the operations further comprise:
   selecting a particular NAN data link schedule from a second set of NAN data link schedules corresponding to a second NAN data link profile, the second NAN data link profile associated with a second service, wherein each NAN data link schedule in the second set of NAN data link schedules satisfies second transmission parameters of the second service; and
   transmitting data to a second device based on the particular NAN data link schedule.

13. The first device of claim 12, wherein the second transmission parameters include at least one of a second latency parameter, a second throughput parameter, or a second parameter indicating a connectivity topology associated with the second service, and wherein the particular NAN data link schedule is compatible with the first device.

14. A method for selecting a data link schedule, the method comprising:
   selecting, at a first device, a Neighbor Aware Network (NAN) data link profile for a service of the first device, the NAN data link profile corresponding to a set of NAN data link schedules that satisfy transmission parameters of the service, wherein a default NAN data link profile is selected for a particular service if the particular service fails to specify transmission parameters, and wherein the default NAN data link profile corresponds to a default NAN data link schedule having scheduling parameters that satisfy a median latency, a median throughput, and a many-to-many connectivity topology; and
   sending information identifying the NAN data link profile in a service advertisement to a subscriber device.

15. The method of claim 14, wherein the NAN data link profile is selected from a plurality of NAN data link profiles.

16. The method of claim 14, wherein the transmission parameters include at least one of a latency parameter, a throughput parameter, a parameter indicating a connectivity topology associated with the service, or a combination thereof.

17. The method of claim 14, wherein the NAN data link profile is selected based at least in part on a power attribute of the first device.

18. The method of claim 14, further comprising:
   receiving, from the subscriber device, an indication of one or more NAN data link schedules in the set of NAN data link schedules that are compatible with the subscriber device;
   selecting, at the first device, a particular NAN data link schedule from the one or more NAN data link schedules that is compatible with the first device; and
   transmitting data to the subscriber device based on the particular NAN data link schedule.

19. The method of claim 14, wherein the NAN data link profile is statically assigned to the service, assigned to the service at runtime, or assigned to the service when the service is installed at the first device.

20. The method of claim 14, wherein selecting the NAN data link profile comprises:
   identifying the transmission parameters of the service based on indicators when the service is executed by a processor at the first device; and
   mapping the transmission parameters to the NAN data link profile.

21. The method of claim 14, wherein selecting the NAN data link profile comprises:
   determining attributes of the service, wherein the attributes of the service include the transmission parameters of the service, a traffic type of the service, or a combination thereof; and
   mapping the attributes of the service to the NAN data link profile.

22. The method of claim 14, further comprising:
   detecting a change in network conditions;
   selecting a second NAN data link profile for the service based on the change in network conditions; and
   after a session with the service is complete:
      purging the second NAN data link profile; or
      storing the second NAN data link profile for future sessions.

23. The method of claim 14, wherein selecting the NAN data link profile comprises retrieving the NAN data link profile from a database, and wherein the NAN data link profile is retrieved from the database when the service is executed by a processor at the first device or when the service is installed at the first device.

24. The method of claim 23, wherein the database is included in a cloud computing device.

25. The method of claim 14, further comprising:
   selecting a particular NAN data link schedule from a second set of NAN data link schedules corresponding to a second NAN data link profile, the second NAN data link profile associated with a second service, wherein each NAN data link schedule in the second set of NAN data link schedules satisfies second transmission parameters of the second service; and
   transmitting data to a second device based on the particular NAN data link schedule.

26. The method of claim 25, wherein the second transmission parameters include at least one of a second latency parameter, a second throughput parameter, or a second parameter indicating a connectivity topology associated with the second service, and wherein the particular NAN data link schedule is compatible with the first device.

27. An apparatus comprising:
   means for selecting a Neighbor Aware Network (NAN) data link profile for a service of a provider device, the NAN data link profile corresponding to a set of NAN data link schedules that satisfy transmission parameters of the service, wherein a default NAN data link profile is selected for a particular service if the particular service fails to specify transmission parameters, and wherein the default NAN data link profile corresponds to a default NAN data link schedule having scheduling parameters that satisfy a median latency, a median throughput, and a many-to-many connectivity topology; and means for sending the NAN data link profile in a service advertisement to a subscriber device.

28. A non-transitory computer-readable medium comprising instructions for selecting a data link schedule, the instructions, when executed by a processor within a provider device, cause the processor to perform operations comprising:

selecting a Neighbor Aware Network (NAN) data link profile for a service of the provider device, the NAN data link profile corresponding to a set of NAN data link schedules that satisfy transmission parameters of the service, wherein a default NAN data link profile is selected for a particular service if the particular service fails to specify transmission parameters, and wherein the default NAN data link profile corresponds to a default NAN data link schedule having scheduling parameters that satisfy a median latency, a median throughput, and a many-to-many connectivity topology; and sending the NAN data link profile in a service advertisement to a subscriber device.

* * * * *